(12) United States Patent  
Hirano (10) Patent No.: US 12,538,004 B2  
(45) Date of Patent: Jan. 27, 2026

(54) IMAGING DEVICE

(71) Applicant: CANON KABUSHIKI KAISHA, Tokyo (JP)

(72) Inventor: Yusuke Hirano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 18/590,415

(22) Filed: Feb. 28, 2024

(65) Prior Publication Data

US 2024/0305871 A1  Sep. 12, 2024

(30) Foreign Application Priority Data

Mar. 9, 2023  (JP) .................................. 2023-036642

(51) Int. Cl.
*H04N 23/52* (2023.01)
*B60R 11/04* (2006.01)
*G03B 17/55* (2021.01)
*H04N 23/55* (2023.01)

(52) U.S. Cl.
CPC ............. *H04N 23/52* (2023.01); *G03B 17/55* (2013.01); *H04N 23/55* (2023.01)

(58) Field of Classification Search
CPC ......... H04N 23/52; G03B 17/55; B60R 11/04
USPC .................................................... 348/207.99
See application file for complete search history.

(56) References Cited

U.S. PATENT DOCUMENTS

| 12,088,897 | B1 * | 9/2024 | Patel .................. | H04N 23/52 |
| 2012/0026337 | A1 * | 2/2012 | Boulanger ............. | H04N 23/52 |
| | | | | 348/E5.09 |
| 2021/0094480 | A1 * | 4/2021 | Zhang .................. | G05D 1/0011 |

FOREIGN PATENT DOCUMENTS

JP  2012244016 A  * 12/2012
JP  5829430 B2  12/2015

* cited by examiner

*Primary Examiner* — Anthony J Daniels
(74) *Attorney, Agent, or Firm* — Cowan, Liebowitz & Latman, P.C.

(57) ABSTRACT

An imaging device includes: a casing; an image sensor circuit board housed in the casing and configured such that an image sensor is mounted; a lens unit provided on a light reception surface side of the image sensor and connected to the image sensor circuit board so that the image sensor is housed; an image sensor circuit board heat dissipation unit provided on an opposite side to the light reception surface side of the image sensor circuit board and exposed to outside of the casing; an image sensor heat transmission member configured to transmit heat from the image sensor circuit board to the image sensor circuit board heat dissipation unit; a main circuit board housed in the casing and configured such that an electronic component is mounted; a main circuit board heat transmission member configured to transmit heat from the main circuit board to a main circuit board heat dissipation unit exposed to the outside of the casing; and a heat isolation unit disposed between the image sensor circuit board heat dissipation unit and the main circuit board heat dissipation unit to restrain heat transmission between the image sensor circuit board heat dissipation unit and the main circuit board heat dissipation unit. The heat isolation unit is formed of a material with lower heat conductivity than materials of the image sensor circuit board heat dissipation unit and the main circuit board heat dissipation unit.

4 Claims, 8 Drawing Sheets

IMAGING DEVICE

BACKGROUND OF THE INVENTION

Field of the Invention

The present invention relates to an imaging device that has a heat dissipation structure.

Description of the Related Art

Japanese Patent No. 5829430 discloses an imaging device that includes a cooling unit capable of dissipating heat of an image sensor circuit board and an integrated circuit (IC) circuit board. An image sensor is provided on the image sensor circuit board. The image sensor circuit board and the IC circuit board are disposed to intersect in an extension direction.

In the example of the related art, in the case of an imaging device that is mounted in a vehicle and is influenced by heat from the outside, cooling performance is insufficient depending on a position influenced by heat and a surface area of the cooling unit is required to be larger. As a result, there is a problem that it is difficult to miniaturize the imaging device mounted in the vehicle.

SUMMARY OF THE INVENTION

According to an aspect of the present invention, an imaging device includes: a casing; an image sensor circuit board housed in the casing and configured such that an image sensor is mounted; a lens unit provided on a light reception surface side of the image sensor and connected to the image sensor circuit board so that the image sensor is housed; an image sensor circuit board heat dissipation unit provided on an opposite side to the light reception surface side of the image sensor circuit board and exposed to outside of the casing; an image sensor heat transmission member configured to transmit heat from the image sensor circuit board to the image sensor circuit board heat dissipation unit; a main circuit board housed in the casing and configured such that an electronic component is mounted; a main circuit board heat transmission member configured to transmit heat from the main circuit board to a main circuit board heat dissipation unit exposed to the outside of the casing; and a heat isolation unit disposed between the image sensor circuit board heat dissipation unit and the main circuit board heat dissipation unit to restrain heat transmission between the image sensor circuit board heat dissipation unit and the main circuit board heat dissipation unit. The heat isolation unit is formed of a material with lower heat conductivity than materials of the image sensor circuit board heat dissipation unit and the main circuit board heat dissipation unit.

Further features of the present invention will become apparent from the following description of embodiments with reference to the attached drawings.

BRIEF DESCRIPTION OF THE DRAWINGS

FIGS. 1A to 1C are diagrams illustrating examples of positions at which an imaging device is mounted in a vehicle according to an embodiment of the present invention.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1A:
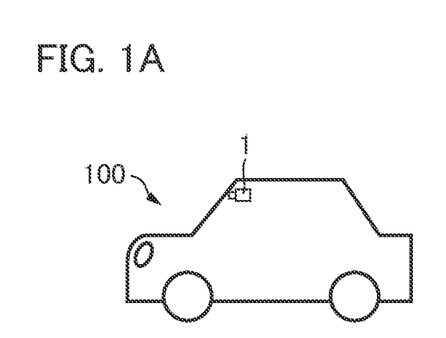
FIG. 1A is a diagram illustrating an example in which the image sensor is disposed near an upper portion of a windshield.
Figure 1B:
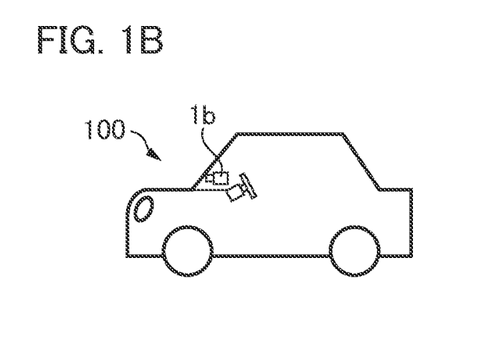
FIG. 1B is a diagram illustrating an example in which the image sensor is disposed in an upper portion of a dashboard.
Figure 1C:
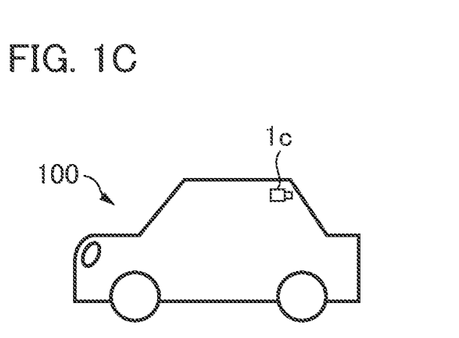
FIG. 1C is a diagram illustrating an example in which the image sensor is disposed near an upper portion of a rear glass.

FIGS. 1A to 1C are diagrams illustrating examples of positions at which an imaging device is mounted in a vehicle according to an embodiment of the present invention. FIG. 1A is a diagram illustrating an example in which the image sensor is disposed near an upper portion of a windshield. An imaging device 1 can be disposed near an upper portion of a windshield in a vehicle interior of a vehicle 100 to monitor the front side of the vehicle 100, as illustrated in FIG. 1A.

In the present embodiment, the imaging device 1 will be described giving an example in which the imaging device 1 is attached to the vehicle 100 which is an automobile serving as a mobile object, but the mobile object is not limited to an automobile. The mobile object may be movable apparatus such as a ship, a train, an airplane, or a drone.

Figure 2:
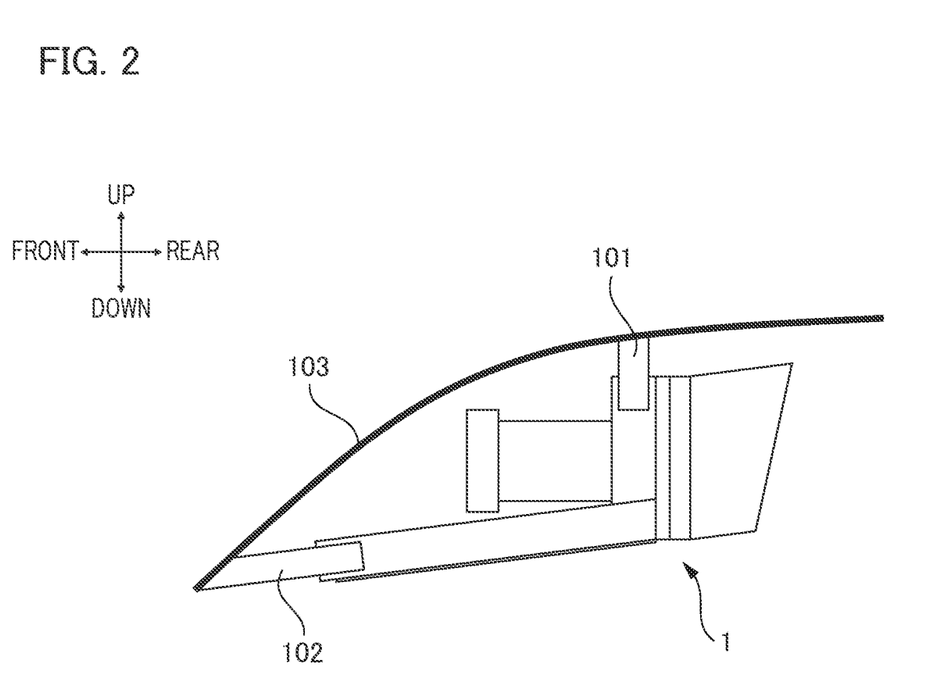
FIG. 2 is a diagram illustrating a detailed disposition example of FIG. 1A.

FIG. 2 is a diagram illustrating a detailed disposition example of FIG. 1A. The imaging device 1 is mounted in the vehicle 100 via brackets 101 and 102. The brackets 101 and 102 are adhered to an upper portion of the windshield 103 in the vehicle interior to fix the imaging device 1. The brackets 101 and 102 and the imaging device 1 are fixed using fastening components such as press-fits or screws.

FIG. 1B is a diagram illustrating an example in which the image sensor is disposed in an upper portion of a dashboard. FIG. 1C is a diagram illustrating an example in which the image sensor is disposed in an upper portion of a rear glass. An in-vehicle camera according to the present embodiment is not limited to such a disposition example, but includes an imaging device that is capable of imaging sides in front and to the rear and is provided at any of various positions at which the sides in front and to the rear can be imaged.

Figure 3:
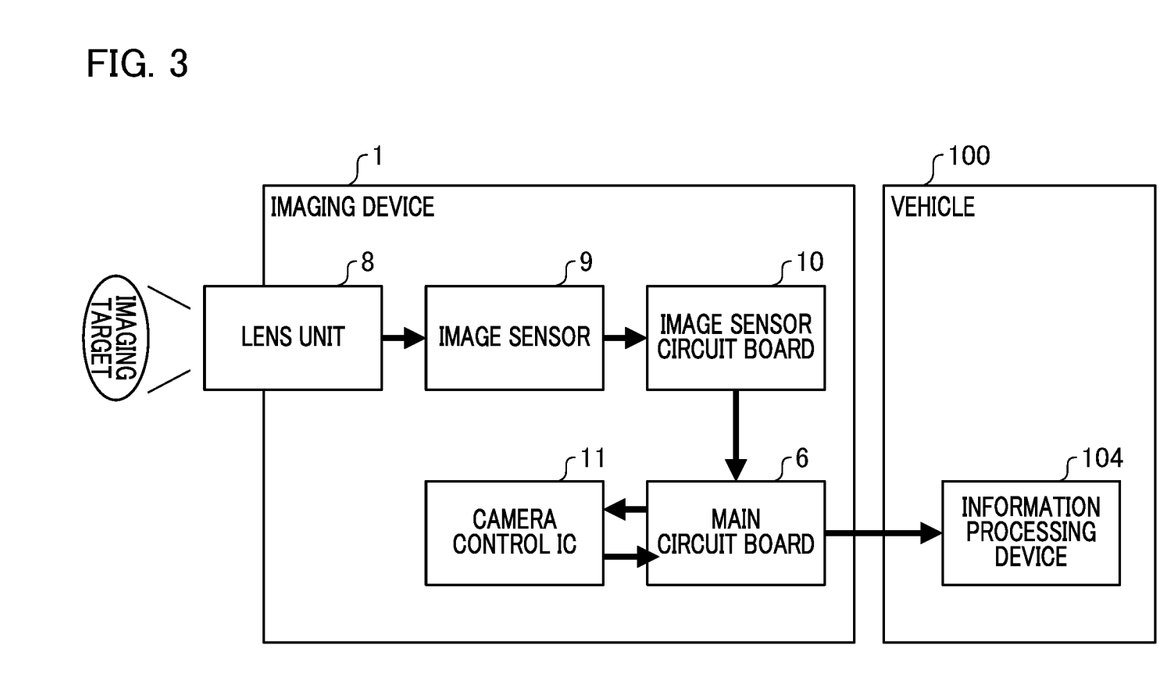
FIG. 3 is a block diagram illustrating a configuration of the image sensor according to the embodiment of the present invention.

FIG. 3 is a block diagram illustrating a configuration of the image sensor according to the embodiment of the present invention. Each block illustrated in FIG. 3 may not be embedded in the same casing or may be configured with different devices connected via signal lines.

The imaging device 1 includes a lens unit 8, an image sensor 9, an image sensor circuit board 10, a camera control IC 11, and a main circuit board 6. The vehicle 100 includes an information processing device 104. Light from an imaging target is incident on the lens unit 8. Light from an imaging target is incident on a light reception surface of the image sensor 9 via the lens unit 8.

The image sensor 9 outputs a signal in accordance with received light. The image sensor 9 is a charge-coupled device (CCD) image sensor, a complementary metal oxide semiconductor (CMOS) image sensor, or the like and is one main heat source.

The image sensor circuit board 10 is included with a signal output circuit and the image sensor is mounted thereon. The signal output circuit outputs an image signal of an imaging target based on a signal output from the image sensor 9. The image signal output from the image sensor circuit board 10 is input to the main circuit board 6.

The main circuit board 6 is connected to the camera control IC 11. The camera control IC 11 processes an image signal output from the image sensor circuit board. The image signal processed by the camera control IC 11 is output from the main circuit board 6 to the information processing device 104 or the like in the vehicle 100. The camera control IC 11 is also one main heat source.

The information processing device 104 in the vehicle 100 recognizes a distance to an imaging target to support driving of a driver. For example, an automated driving device, a collision damage reduction braking device, an inter-vehicle control device, or a lane deviation warning device is included, but the present invention is not limited thereto.

Figure 4A:
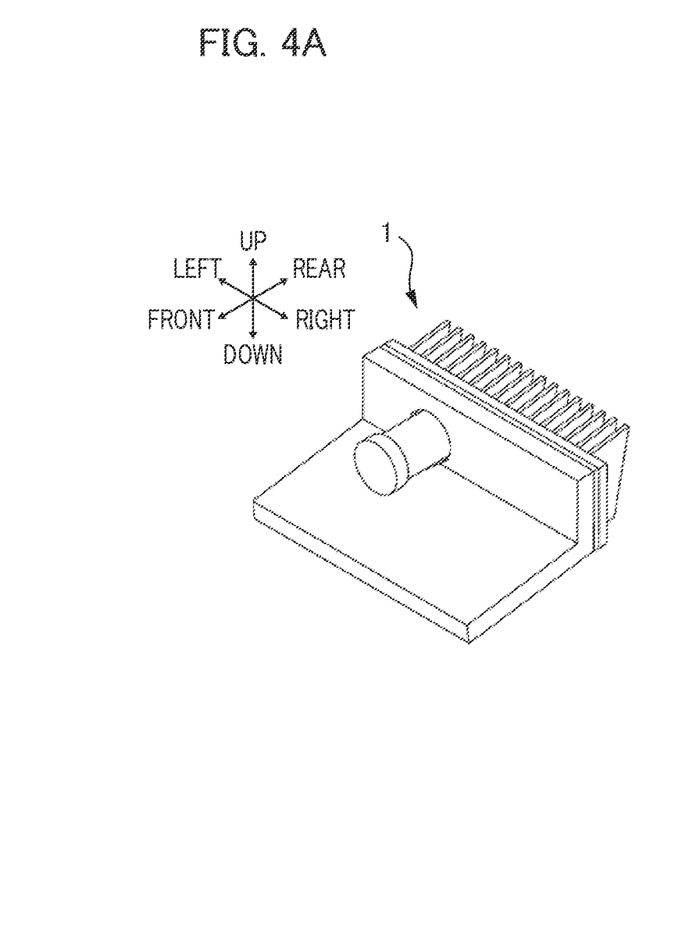
FIG. 4A is an external view illustrating the imaging device according to the embodiment of the present invention and FIG. 4B is an exploded view illustrating the imaging device according to the embodiment of the present invention.
Figure 4B:
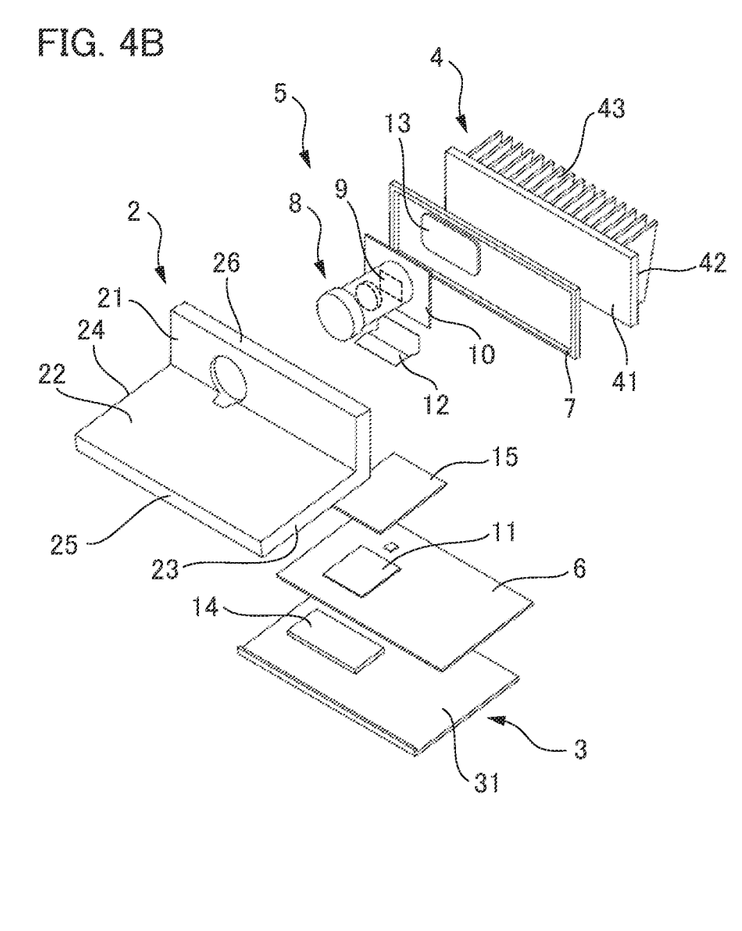
Figure 5:
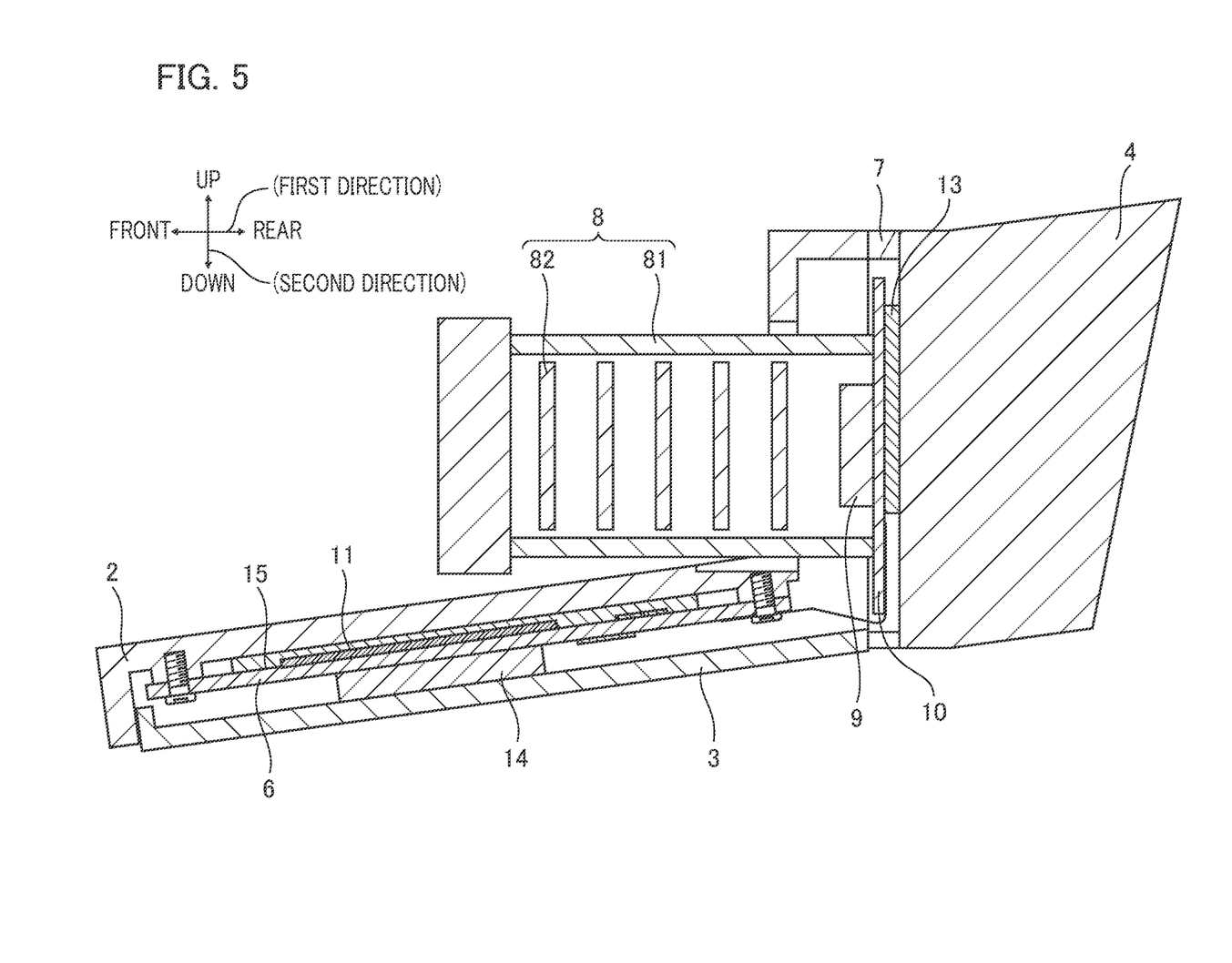
FIG. 5 is a sectional view illustrating an optical axis of the image sensor according to the embodiment of the present invention.

FIG. 4A is an external view illustrating the imaging device according to the embodiment of the present invention. FIG. 4B is an exploded view illustrating the imaging device according to the embodiment of the present invention. FIG. 5 is a sectional view illustrating an optical axis of the imaging device according to the embodiment of the present invention. As illustrated in FIGS. 4A and 4B, in the imaging device 1 according to the present embodiment, an image sensor unit 5, the main circuit board 6, a heat isolation unit 7, and the like are mainly housed in casings including an upper casing 2, a lower casing 3, and a rear casing 4.

The upper casing 2 is made of a metal with high heat conductivity and forms an outer coat of the front side of the imaging device 1. The upper casing 2 includes a front wall portion 21, an upper wall portion 22, a right side wall portion 23, a left side wall 24, a front side wall portion 25, and an upper wall portion 26. The front wall portion 21 is formed in a flat plate shape disposed parallel to an image sensor to be described below.

In the front wall portion 21, a hole opens to fit the lens unit 8 for mounting. The upper wall portion 22 intersects the front wall portion 21. The upper wall portion 22 extends slightly frontward and downward from the front wall portion 21 to form a flat plate shape. A heat dissipation fin may be disposed on the upper side of the upper wall portion 22.

The main circuit board 6 on which an electronic component to be described below is mounted is mounted on the lower side of the upper wall portion 22. The upper wall portion 22 is disposed substantially parallel to the main circuit board 6. The front wall portion 21 of the upper casing 2 is disposed to face outside of the vehicle, and at least one of the front wall portion 21 and the upper wall portion 22 of the upper casing 2 functions as an attachment portion for attaching the imaging device to the vehicle.

The lower casing 3 is made of a metal with high heat conductivity and forms an outer coat of the lower side of the imaging device 1. A flat surface portion 31 is formed in a flat plate shape in parallel to the upper wall portion 22. The lower casing 3 is installed to block the lower side of the upper casing 2.

The rear casing 4 is made of a metal with high heat conductivity and forms an outer coat of the rear side of the imaging device 1. A front wall portion 41 of the rear casing 4 is disposed parallel to the image sensor circuit board 10. A rear wall portion 42 of the rear casing 4 includes a heat dissipation fin 43. Here, the heat dissipation fin 43 is disposed on an opposite side to a light reception surface of the image sensor in the image sensor substrate 10 and functions as an image sensor circuit board heat dissipation unit exposed to the outside of the casing.

The fin 43 of the rear casing 4 has a plurality of rib forms extending in a vertical direction of the rear wall portion 42. The fin 43 serves as a heat dissipation unit of the image sensor 9. The image sensor unit 5 mainly includes the lens unit 8, the image sensor 9, and the image sensor circuit board 10.

In the lens unit 8, a plurality of lenses 82 are housed in a cylindrical lens barrel 81 made of a metal such as aluminum or a resin, as illustrated in FIG. 5. An end of the lens unit 8 in a first direction that is an optical axis in which the plurality of lenses 82 extend in a row is attached and fixed at right angles to the image sensor circuit board 10 by an adhesive or the like.

The image sensor 9 is attached to the lens unit 8 side of the image sensor circuit board 10 and is housed in the lens barrel 81 of the lens unit 8. That is, the lens unit 8 is installed on the light reception surface of the image sensor 9 and is connected to the image sensor circuit board 10 so that the image sensor 9 is housed.

The image sensor 9 is a main heat source of the image sensor unit 5. The image sensor circuit board 10 is formed in a flat plate shape extending in up, down, right, and left directions. The image sensor circuit board 10 includes a driving control circuit that controls an operation of the image sensor 9.

An image sensor heat dissipation member 13 is closely stacked on the rear surface of the image sensor circuit board 10 of the image sensor unit 5. The image sensor heat dissipation member 13 is formed in a thin film shape and made of an elastomer material such as silicone.

The image sensor heat dissipation member 13 is in contact with the front wall portion 41 of the rear casing 4 so that heat of the image sensor 9 is transmitted to the rear casing 4. The heat transmitted to the front wall portion 41 of the rear casing 4 dissipate from the fin 43 provided in the rear wall portion 42.

The image sensor heat dissipation member 13 transmits heat through the image sensor circuit board 10 and the fin 43 serving as the image sensor circuit board heat dissipation unit. That is, the heat generated in the image sensor 9 is configured such that the heat dissipates from the fin 43 via the image sensor circuit board 10 and the image sensor heat transmission member stacked on the image sensor substrate.

The main circuit board 6 is formed in a flat plate shape extending in the front, rear, right, and left directions. The main circuit board 6 is bonded to a boss portion of the upper wall portion 22 of the upper casing 2 by a fastening component such as a screw. The main circuit board 6 may be bonded to the lower casing 3.

The main circuit board 6 includes a plurality of electronic components on the upper and lower surfaces. The main circuit board 6 and the image sensor circuit board 10 are electrically connected via a wiring 12. The plurality of electronic components mounted on the main circuit board 6 includes a camera control IC 11.

The camera control IC 11 generally controls the entire imaging device 1. The plurality of electronic components mounted on the main circuit board 6 are heat sources and the camera control IC 11 is a heat source that generate a larger amount of heat among the plurality of electronic components.

An upper surface heat transmission member 15 is stacked on the upper surface of the main circuit board 6. The upper surface heat transmission member 15 is made of an elastomer material such as silicone and is in a thin film state. The upper surface heat transmission member 15 is in contact with the camera control IC 11 and is in contact with at least some of the plurality of electronic components.

The upper surface heat transmission member 15 is in contact with the lower side of the upper wall portion 22 of the upper casing 2 and transmits heat of the electronic components including the camera control IC 11. The heat transmitted to the lower side of the upper wall portion 22 of the upper casing 2 dissipates from the upper side of the upper wall portion 22.

A lower surface heat transmission member 14 is stacked on the lower surface of the main circuit board 6. The lower surface heat transmission member 14 is made of an elastomer material such as silicone and is in a thin film state. The lower surface heat transmission member 14 is in contact with at least some of the plurality of electronic components. The lower surface heat transmission member 14 is in contact with the upper side of the lower casing 3 so that heat of the electronic components is transmitted.

The lower casing 3 receives the heat transmitted from the lower surface heat transmission member 14 from the upper side and cause the heat to dissipate from the lower side of the lower casing 3. The upper wall portion 22 of the upper casing 2 and of the main circuit board 6 illustrated in FIG. 4 is disposed below the lens unit 8, but may be disposed above the lens unit 8.

In this way, the upper casing 2 and the lower casing 3 function as a main circuit board heat dissipation unit exposed to the outside of the casings, and the upper surface heat transmission member 15 and the lower surface heat transmission member 14 function as main circuit board heat transmission member that transmits heat through a main circuit board heat dissipation unit and the main circuit board 6.

The main circuit board heat dissipation unit includes two casings interposing the main circuit board 6 and is configured to cause heat generated from the electronic components to dissipate from the outside of the two casings via the main circuit board 6 and the main circuit board heat transmission member stacked on the main circuit board 6.

The heat isolation unit 7 is formed of a resin in a hollow rectangular shape in which rectangular holes in a rectangle of the flat plate shape. As illustrated in FIG. 5, the heat isolation unit 7 is disposed between the upper casing 2 and the rear casing 4 and is disposed between the lower casing 3 and the rear casing 4, and restrain heat transmission between the upper casing 2 and the lower casing 3, and the rear casing 4.

The heat isolation unit 7 functions as a heat isolation unit that is disposed between the image sensor circuit board heat dissipation unit and the main circuit board heat dissipation unit to restrain heat transmission between the image sensor circuit board heat dissipation unit and the main circuit board heat dissipation unit. The heat isolation unit 7 is formed of a material with lower heat conductivity than materials of the image sensor circuit board heat dissipation unit and the main circuit board heat dissipation unit.

Figure 6:
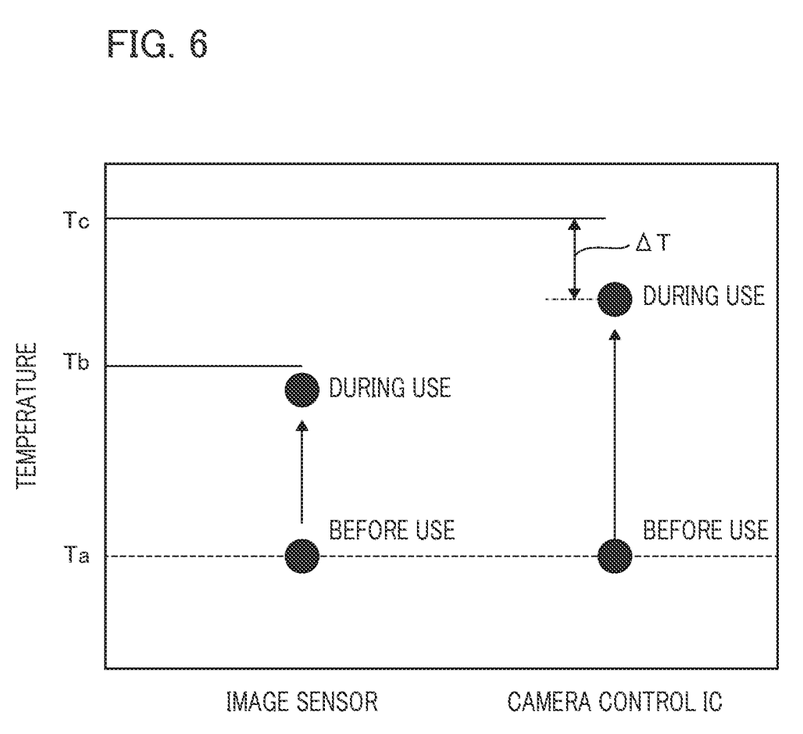
FIG. 6 is a diagram illustrating temperatures before and during use of a camera control IC and the image sensor which is a component of the imaging device according to the embodiment of the present invention.

Next, an operation of the imaging device 1 according to the present embodiment will be described. FIG. 6 is a diagram illustrating temperatures before and during use of a camera control IC and the image sensor which is a component of the imaging device according to the embodiment of the present invention. As illustrated in the graph of FIG. 6, in a state before the use, both a temperature of the image sensor 9 and a temperature of the camera control IC 11 are, for example, a temperature Ta.

Conversely, in a state during the use, the temperature of the image sensor 9 rises due to generated heat, but the heat of the image sensor 9 dissipates from the fin 43 on the rear side of the rear casing 4 via the image sensor circuit board 10 and the image sensor heat dissipation member 13. Therefore, it is possible to control the temperature of the image sensor 9 which is being used to an allowable temperature Tb or less.

Similarly, in the state during the use, a temperature of the camera control IC 11 rises due to generated heat, but heat of the camera control IC 11 dissipates from the upper casing 2 via the upper surface heat transmission member 15. The heat of the camera control IC 11 dissipates from the lower casing 3 via the lower surface heat transmission member 14.

Therefore, it is possible to control the temperature during the use of the camera control IC 11 to an allowable temperature Tc or less. Further, the camera control IC 11 has a high allowable temperature and has a margin of ΔT. Therefore, even when there is an influence of heat from the outside, the temperature can be controlled to the allowable temperature Tc or less.

The heat isolation unit 7 thermally insolates a space between the upper casing 2 and the rear casing 4 and a space between the lower casing 3 and the rear casing 4. Therefore, heat is less likely to transmit from a high temperature side to a low temperature side in a space between a heat dissipation route of the image sensor 9 and a heat dissipation route of the camera control IC 11.

Figure 7:
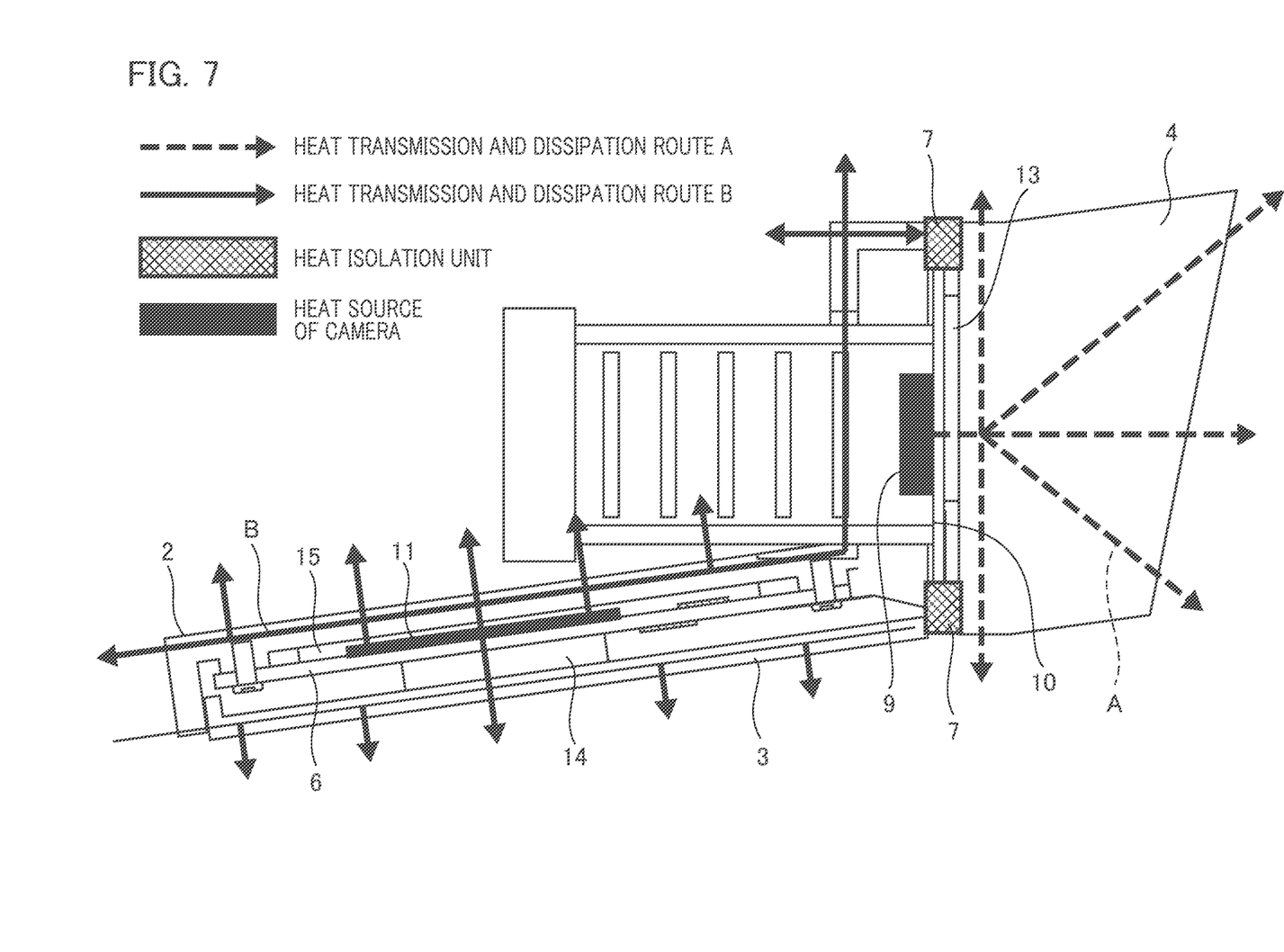
FIG. 7 is a schematic diagram illustrating a heat transmission route and a heat dissipation route from a heat source of a camera of the imaging device according to the embodiment of the present invention.

Next, a heat dissipation effect of the imaging device 1 according to the present embodiment will be described. FIG. 7 is a schematic diagram illustrating a heat transmission route and a heat dissipation route from a heat source of a camera of the imaging device according to the embodiment of the present invention.

As illustrated in FIG. 7, the heat isolation unit 7 is disposed in a portion in which heat transmission and dissipation route A of the rear casing 4 through which heat of the image sensor 9 dissipates is closest to a heat transmission and dissipation route B of the upper casing 2 and the lower casing 3 through which heat of the camera control IC 11 and the like dissipates. Accordingly, heat conduction between the heat transmission and dissipation routes A and B is efficiently blocked or restrained.

Therefore, in the imaging device 1 according to the present embodiment, it is easy to ensure independency of each heat dissipation route of the image sensor 9 and the camera control IC 11 and it is possible to restrain heat transmission between the heat dissipation routes of the image sensor 9 and the camera control IC 11.

Accordingly, as illustrated in FIG. 6, it is possible to design heat dissipation of the image sensor 9 and the camera control IC 11 so that a temperature during use of the image sensor 9 is less than the allowable temperature Tb and a temperature during use of the camera control IC 11 is less than the allowable temperature Tc. Therefore, it is easy to miniaturize the imaging device 1.

Figure 8:
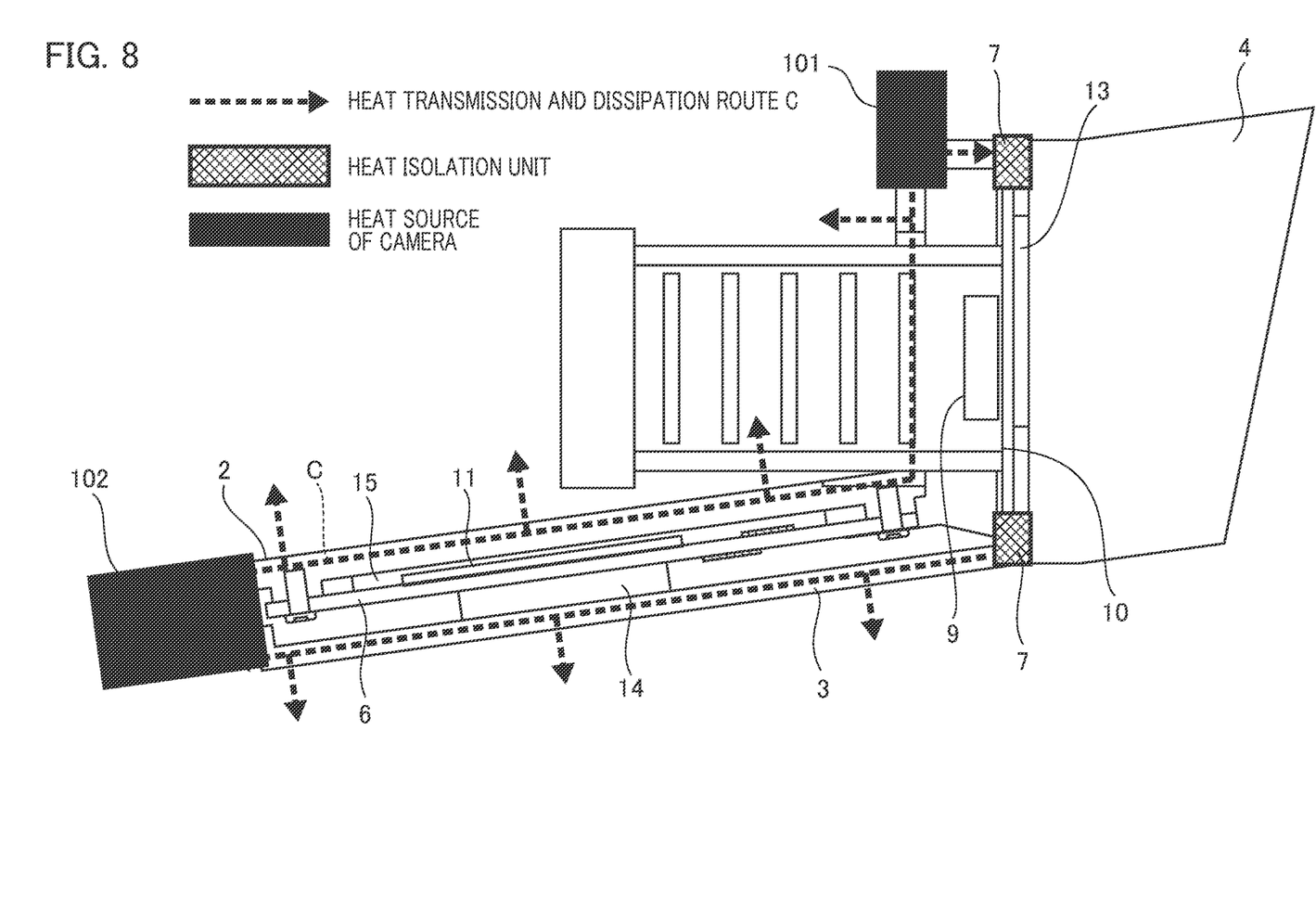
FIG. 8 is a schematic diagram illustrating heat transmission and heat dissipation routes from a heat source of a vehicle attachment portion of the imaging device according to the embodiment of the present invention.

In the imaging device 1 according to the present embodiment, it is less likely to have an influence of heat from the brackets or the like. FIG. 8 is a schematic diagram illustrating heat transmission and heat dissipation routes from a heat source of a vehicle attachment portion of the imaging device according to the embodiment of the present invention.

As illustrated in FIG. 8, the brackets 101 and 102 which are an attachment portion of the vehicle can serve as a heat source from the outside. However, in the imaging device 1 according to the present embodiment, even when there is the influence of the heat from the outside, the heat dissipates to the upper casing 2 and the lower casing 3 via a heat transmission and dissipation route C. That is, the temperature can be the allowable temperature Tc or less and the allowable temperature of the camera control IC 11 can have a margin.

Further, it is less likely to transmit the heat from the outside to the image sensor 9 and it is possible to considerably reduce the influence of the heat from the outside. On the other hand, the heat of the image sensor 9 can efficiently dissipate from the pin 43 on the rear side of the rear casing 4 via the image sensor circuit board 10 and the image sensor heat dissipation member 13.

In the imaging device 1 according to the present embodiment, as illustrated in FIG. 5, the image sensor heat dissipation member 13 is closely stacked on the image sensor circuit board 10. Therefore, as indicated by the heat transmission and dissipation route A in FIG. 7, a heat transmission direction of the image sensor 9 can be guided by the image sensor heat dissipation member 13.

In the imaging device 1 according to the present embodiment, as illustrated in FIG. 5, the upper surface heat transmission member 15 and the lower surface heat transmission member 14 are closed stacked on the main circuit board 6. Therefore, as indicated by the heat transmission and dissipation route B in FIG. 7, a heat transmission direction of the camera control IC 11 can be guided by the upper surface heat transmission member 15 and the lower surface heat transmission member 14.

Others

The mode of the imaging device according to the present invention has been described above. However, a mode is not limited to the above embodiment. Various modifications and improvements can also be made.

For example, in the above embodiment, the transmission of the heat is blocked or restrained by the heat isolation unit 7 in the space between the upper casing 2 and the rear casing 4 and the space between the lower casing 3 and the rear casing 4, but partial contacts may also be allowed. The materials of the image sensor heat dissipation member 13, the lower surface heat transmission member 14, and the upper surface heat transmission member 15 may be materials with higher heat conductivity than the materials of the image sensor circuit board 10 or the main circuit board 6. For example, silicon, graphite, or the like may be used.

The material of the heat isolation unit 7 may be a material with lower heat conductivity than the materials of the upper casing 2, the lower casing 3, and the rear casing 4. For example, resin, glass, rubber foam, aerogel, or the like may be used. The materials of the upper casing 2, the lower casing 3, and the rear casing 4 may be materials with high heat conductivity such as aluminum, cooper, or zinc.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging device or the like through a network or various storage media. Then, a computer (or a CPU, an MPU, or the like) of the imaging device or the like may be configured to read and execute the program. In such a case, the program and the storage medium storing the program configure the present invention.

The present invention includes those implemented, for example, using at least one processor or circuit configured to have functions of the embodiments explained above. A plurality of processors may be used for distribution.

This application claims the benefit of priority from Japanese Patent Application No. 2023-36642, filed on Mar. 9, 2023, which is hereby incorporated by reference herein in its entirety.

What is claimed is:

1. An imaging device comprising:
   a casing;
   an image sensor circuit board housed in the casing and configured such that an image sensor is mounted;
   a lens unit provided on a light reception surface side of the image sensor and connected to the image sensor circuit board so that the image sensor is housed;
   an image sensor circuit board heat dissipation unit provided on an opposite side to the light reception surface side of the image sensor circuit board and exposed to outside of the casing;
   an image sensor heat transmission member configured to transmit heat from the image sensor circuit board to the image sensor circuit board heat dissipation unit;
   a main circuit board housed in the casing and configured such that an electronic component is mounted;
   a main circuit board heat transmission member configured to transmit heat from the main circuit board to a main circuit board heat dissipation unit that is exposed to the outside of the casing; and
   a heat isolation unit disposed between the image sensor circuit board heat dissipation unit and the main circuit board heat dissipation unit to restrain heat transmission between the image sensor circuit board heat dissipation unit and the main circuit board heat dissipation unit,
   wherein the heat isolation unit is formed of a material with lower heat conductivity than materials of the image sensor circuit board heat dissipation unit and the main circuit board heat dissipation unit,
   wherein the main circuit board heat dissipation unit includes two casings covering the main circuit board so that the casings sandwich the main circuit board, and
   wherein heat generated from the electronic component dissipates from an outside of the two casings via the main circuit board and the main circuit board heat transmission member stacked on the main circuit board.

2. The imaging device according to claim 1,
   wherein the image sensor circuit board heat dissipation unit includes a rear casing that has a heat dissipation fin, and wherein heat generated by the image sensor dissipates from the fin via the image sensor circuit board and the image sensor heat transmission member stacked on the image sensor circuit board.

3. The imaging device according to claim 1,
wherein the image sensor circuit board heat dissipation unit includes a rear casing,
wherein the heat isolation unit is disposed between the two casings and the rear casing so that heat transmission between the two casings and the rear casing is restrained.

4. The imaging device according to claim 3,
wherein one of the two casings includes a front wall portion on which the lens unit is mounted and an upper wall portion disposed substantially parallel to the main circuit board, and
wherein at least one of the front wall portion and the upper wall portion functions as an attachment portion for attaching the imaging device to a mobile object.

\* \* \* \* \*